(12) United States Patent
Schilling

(10) Patent No.: US 6,878,308 B2
(45) Date of Patent: Apr. 12, 2005

(54) METHOD FOR INHIBITING FREEZE-CLUMPING OF AGGREGATE MATERIALS

(75) Inventor: Kevin H. Schilling, Muscatine, IA (US)

(73) Assignee: Grain Processing Corp., Muscatine, IA (US)

( * ) Notice: Subject to any disclaimer, the term of this patent is extended or adjusted under 35 U.S.C. 154(b) by 0 days.

(21) Appl. No.: 10/325,547

(22) Filed: Dec. 20, 2002

(65) Prior Publication Data
US 2003/0132419 A1 Jul. 17, 2003

Related U.S. Application Data

(60) Provisional application No. 60/389,856, filed on Jun. 19, 2002, and provisional application No. 60/343,667, filed on Dec. 28, 2001.

(51) Int. Cl.$^7$ ................................................ C09K 3/18
(52) U.S. Cl. ........................... 252/70; 106/13; 427/212; 428/403
(58) Field of Search ............................. 252/70; 106/13; 427/212; 428/403

(56) References Cited

U.S. PATENT DOCUMENTS

| | | | |
|---|---|---|---|
| 4,117,214 A | 9/1978 | Parks et al. ............... 44/601 |
| 4,162,347 A * | 7/1979 | Montgomery ............. 252/70 |
| 4,254,166 A | 3/1981 | Glanville et al. .......... 427/212 |
| 4,388,203 A | 6/1983 | Nimerick et al. .......... 252/70 |
| 4,421,791 A | 12/1983 | Kekish et al. ............. 427/239 |
| 4,439,337 A * | 3/1984 | Nimerick et al. .......... 252/70 |
| 4,501,775 A | 2/1985 | Parks et al. ............... 44/601 |
| 4,511,485 A | 4/1985 | Gancy ....................... 252/70 |
| 4,588,512 A | 5/1986 | Rippie ....................... 252/70 |
| 4,594,076 A * | 6/1986 | Blake et al. ............... 44/500 |
| 4,599,250 A * | 7/1986 | Cargle et al. ............. 44/601 |
| 4,778,615 A | 10/1988 | Jeglic ....................... 252/70 |
| 4,824,588 A * | 4/1989 | Lin ........................... 252/70 |
| 5,639,319 A | 6/1997 | Daly ......................... 152/450 |
| 5,891,225 A | 4/1999 | Mishra et al. ............. 106/14.42 |
| 6,080,330 A | 6/2000 | Bloomer ................... 252/70 |
| 6,299,793 B1 * | 10/2001 | Hartley et al. ............ 252/70 |
| 6,398,979 B2 * | 6/2002 | Koefod et al. ............ 252/70 |
| 6,436,310 B1 * | 8/2002 | Hartley et al. ............ 252/70 |
| 6,440,625 B1 * | 8/2002 | Hartley et al. ............ 252/70 |
| 6,468,442 B2 * | 10/2002 | Bytnar ...................... 252/70 |
| 6,582,622 B1 * | 6/2003 | Hartley et al. ............ 252/70 |
| 6,596,188 B1 * | 7/2003 | Hartley et al. ............ 252/70 |
| 6,599,440 B2 * | 7/2003 | Hartley et al. ............ 252/70 |

FOREIGN PATENT DOCUMENTS

| | | |
|---|---|---|
| SU | 1664808 A1 * | 7/1991 |
| WO | WO 00/50531 | 8/2000 |

OTHER PUBLICATIONS

Norin Suisan Koku Kyokai, Liquid Snow–Melting Agent, Kimata Shizuro, Abstract (1983) (no month).

* cited by examiner

Primary Examiner—Anthony J. Green
(74) Attorney, Agent, or Firm—Banner & Witcoff, Ltd.

(57) ABSTRACT

Disclosed is a method for inhibiting the freeze-clumping of an aggregate material, such as coal. The invention contemplates applying to the coal an anti-icing material, the anti-icing material comprising molasses solids, such as desugared sugar beet molasses solids or sugar cane molasses solids and/or an aqueous solution of glucose, fructose, or of DP 2-5 polymers thereof. The anti-icing material has a viscosity sufficient to adhere to the aggregate material to an extent suitable to inhibit freeze-clumping thereof. Also disclosed is a clump-inhibited aggregate material that comprises an aggregate of units of a material in combination with an anti-icing material as heretofore described.

9 Claims, No Drawings

METHOD FOR INHIBITING FREEZE-CLUMPING OF AGGREGATE MATERIALS

CROSS-REFERENCE TO RELATED PATENT APPLICATIONS

This patent application claims priority to prior provisional application No. 60/343,667, filed Dec. 28, 2001, and also to prior application No. 60/389,856, filed Jun. 19, 2002. Both prior applications are hereby incorporated by reference in their entireties.

TECHNICAL FIELD OF THE INVENTION

The invention is in the field of anti-icing and deicing compositions. The invention pertains to the use of an anti-icing composition to inhibit clumping of aggregate materials due to freezing conditions. In particularly preferred embodiments, the invention is directed towards a method for inhibiting freeze-clumping of coal.

BACKGROUND OF THE INVENTION

The transportation, conveying, and handling of large quantities of aggregate materials such as coal can be difficult in cold weather, wherein cold temperatures can cause moisture present in or on the aggregate material to freeze to thereby bind the individual units of the aggregate material together to form a large mass. This phenomenon is referred to herein as "freeze-clumping." Freeze-clumping can make it difficult to unload railcars or trucks containing coal or other aggregate materials. For instance, the coal can cause damage to hoppers and other receiving equipment. In addition, when unloading a railcar or truck, a large percentage of the load can stick to the bottom of the car or truck, causing further difficulties.

Heretofore, the prior art has taught to apply an anti-icing agent to the aggregate material and/or to the inside walls of the transporting equipment. The anti-icing agent is an agent that prevents or inhibits the formation of ice in or near the aggregate material. Generally, anti-icing agents may serve under proper conditions to remove ice or snow already present on a surface; this function is known as de-icing, and the same agents that are used for anti-icing often may be used for deicing. Anti-icing agents may be sprayed onto the coal as it is being handled by conveying equipment, such as a conveyor belt, prior to introduction into a railcar or truck. Alternatively, an anti-icing solution may be sprayed onto the pile of coal after it has been loaded onto the car or truck.

The prior art has provided various anti-icing agents. Chloride salts, in particular calcium and sodium chloride are commonly used, but these compounds suffer from a number of drawbacks. The principal drawback with such chloride salts is corrosivity of the conveying and transporting equipment, and also, in the case of coal, of the furnaces in which the coal is fired. In addition, sodium chloride is somewhat less effective at anti-icing than calcium chloride, but calcium chloride is more expensive. Commercial chloride salts may include significant amounts of heavy metals, which are of particular concern because they can adversely affect furnace components and can accumulate in the ash left over after coal combustion, thus causing disposal problems.

The prior art has also taught to treat coal with diesel fuel. Diesel fuel can be effective in inhibiting freeze-clumping of the coal, and adds combustible caloric content to the coal. However, diesel fuel can degrade conveyor belts used to convey the coal. Moreover, diesel fuel is a non-renewable resource, and can cause environmental problems if fuel drips off (or "leaches" out) of the coal.

Another class of anti-icing agents include glycols, in particular ethylene glycol and diethylene glycol. Although effective at some temperatures, these compounds are toxic, and also have a limited range of effective temperatures. Moreover, these glycols are costly.

It is desirable to provide a method for inhibiting freeze-clumping of an aggregate material such as coal with an anti-icing material that is less corrosive than an equivalent amount of chloride salt, and that is effective for its intended purpose. The anti-icing agent should not introduce large amounts of metals and other components into the aggregate material.

It is a general object of the invention to provide a method for inhibiting freeze-clumping of an aggregate material that, in preferred embodiments, satisfies these criteria.

THE INVENTION

The invention provides a method for inhibiting freeze-clumping of an aggregate material, the aggregate material comprising coal in the preferred embodiments of the invention. The invention further provides a clump-inhibited aggregate material. In accordance with the method of the invention, a method for inhibiting freeze-clumping of an aggregate material generally comprises applying to the aggregate material an aqueous solution of molasses solids, preferably de-sugared sugar beet molasses solids or sugar cane molasses solids, or an aqueous solution of glucose, fructose, or DP 2-5 polymers of glucose and/or fructose, preferably high fructose corn syrup. The solution has a viscosity sufficient to adhere to the aggregate material to an extent suitable to inhibit freeze-clumping thereof. The clump-inhibited aggregate material in accordance with the invention comprises a plurality of units of a material forming an aggregation and an anti-icing material in combination with at least some of the units and being present in combination with the aggregate material in at least in an amount effective to inhibit freeze-clumping of the aggregate material. The anti-icing material comprises one of the heretofore articulated anti-icing materials, and has a viscosity sufficient to adhere to the aggregate material to an extent suitable to inhibit freeze-clumping thereof.

The anti-icing material used in conjunction with the invention may comprise mixtures of some or all of the anti-icing materials heretofore articulated, alone or in combination with other ingredients such as freezing point lowering agents or viscosifiers. In preferred embodiments of the invention, the anti-icing materials may be formulated very inexpensively, yet will be effective over a wide range of temperatures. Moreover, the anti-icing materials are less corrosive than equivalent amounts of chloride salt solutions, and will not introduce heavy metals or other undesirable components into the aggregate material.

DESCRIPTION OF THE PREFERRED EMBODIMENTS

The invention is contemplated to be applicable to a method for inhibiting freeze-clumping of any suitable aggregate material. In preferred embodiments, the aggregate material is contemplated to be coal, but the invention should be deemed applicable to gravel, rock, or other material that exists as a plurality of units forming or formable into an aggregate pile and that is susceptible to treatment with the anti-icing materials described herein for purposes of inhibiting freeze-clumping.

The method contemplates applying an anti-icing material to the aggregate material, by which is contemplated any suitable method of application. Generally, the anti-icing material is provided as a solution which can be sprayed onto the aggregate material. This can be done after the aggregate material has been loaded into a railcar or truck, but more preferably, the anti-icing material is applied as the aggregate material is being transported via a conveyor, i.e., a conveyor belt, a push cart, or other suitable means of conveyance. In some embodiments of the invention, the anti-icing material will be applied to the aggregate material as the coal is falling from a conveyor belt; this still should be considered as being within the purview of this embodiment of the invention.

The anti-icing solution may include desugered sugar beet molasses solids or sugar cane molasses solids. Desugared sugar beet molasses is the by-product of the process used to extract sugar from sugar beets. Sugar cane molasses (which generally is not subjected to a subsequent desugaring step in commercial applications) is a byproduct of the sugar cane industry. Preferred embodiments of the invention make use of desugared sugar beet molasses or sugar cane molasses. With respect to sugar beet molasses, as is well known in the art, sugar beets are used to produce commercial grade sugar that serves as a substitute for the often more expensive cane sugar. The older of the two most widely used processes of removing sugar from sugar beets involves cleaning the beets and slicing them into thin chips. The sliced beets are then subjected to a sugar extraction process whereby hot water is passed over the beets for approximately one hour. This process removes most, but not all, of the sugar from the beets in the form of beet "juice." The beets are then pressed in screw presses to remove the remaining juice therefrom. The juice is then subjected to a process called carbonation, whereby small clumps of chalk are provided in the juice to filter out any non-sugars. The chalk is then filtered from the juice, which is then evaporated a syrup. The syrup is then boiled until sugar crystals form therein. Once the crystals form, the resulting mixture is centrifuged to separate the crystals from the remaining product, which remaining product is characterized as molasses. Desugared sugar beet molasses preferably is prepared by a process known as the Steffen process, in which a calcium precipitate is formed to remove additional sugar. This process is described briefly in U.S. Pat. No. 5,639,319 to Daly, which purports to teach the use of desugared sugar beet molasses as a tire ballast. Another process for desugaring molasses involves an ion exchange reduction of the sugar content. With respect to sugar cane molasses, this product may be prepared via any method or process known in the art or otherwise found to be suitable. Generally, desugared sugar beet molasses and sugar cane molasses may be purchased commercially. The molasses may be used as supplied or may be diluted or further modified. The solution of molasses solids may, in other words, comprise the molasses itself, or a molasses that has been diluted or otherwise modified, or molasses solids obtained otherwise.

Alternatively, or in addition thereto, the anti-icing material used in conjunction with the invention is an aqueous solution of glucose, fructose, or DP 2-5 polymers thereof. It is contemplated that a solution may include amounts of a higher polymer, or may include a mixture of a plurality of such species. One preferred anti-icing material is high fructose corn syrup solids. High fructose corn syrup is an aqueous solution of fructose, glucose, and lower order polymers thereof. The high fructose corn syrup may be used as supplied or may be diluted or blended with other ingredients.

The anti-icing materials heretofore described generally are provided in an aqueous solution having any suitable solids content. Preferably, the solids content of the aqueous solution ranges from 20 to 90%, more preferably, from 50 to 85% solids, and most preferably from 50 to 70% solids.

In highly preferred embodiments, the anti-icing material further includes a freezing point lowering agent. Generally, the freezing point lowering agent is a compound that by virtue of its colligative presence in the solution will lower the freezing point of the solution. While any solute will lower the freezing point of water, preferred freezing point agents include sodium chloride, calcium chloride, magnesium chloride, potassium chloride, sodium formate, calcium magnesium acetate, and potassium acetate. The preferred concentration of the salt is from 5 to 40% by weight in the anti-icing solution. When the freezing point lowering agent is sodium chloride, it may be added in the form of a brine, such as a 23% brine.

The anti-icing materials should have a viscosity sufficient to adhere to the aggregate material to an extent suitable to inhibit the freeze-clumping thereof. The material preferably has a viscosity of at least 15 cP, as measured using the Shell Cup method at the intended application temperature, with a preferred viscosity range being from 15 to 50 cP and a highly preferred range being from 20 to 25 cP. The preferred application temperature is 40° F., but the application temperature may vary (generally, the anti-icing solution will become more viscous as the temperature decreases). Higher viscosities will be effective but may in some instances cause difficulty in spraying. Moreover, in embodiments where a solution is sprayed onto the top of a railcar or truck, the viscosity should be sufficiently low to allow the anti-icing material to flow down through substantially the entire mass of aggregate material. The anti-icing material may include a visocifier, such as guar gum, carboxymethlycellulose, hydroxyethylcellulose, or the like to achieve the desired viscosity. The viscosifiers may be present in any suitable amount, but preferably such materials, when present, are present in an amount from 0.1 to 5% by weight.

The following examples are provided to illustrate the present invention, but should not be construed as limiting the invention in scope.

EXAMPLE 1

A solution of high fructose corn syrup as supplied had a solids content of 71% and a freezing point below −40° C. The solution had a viscosity of 150 cP at 80° F. and 700 cP at 40° F.

This solution is sprayed onto a moving coal bed carried on a conveyor belt.

EXAMPLE 2

A solution of high fructose corn syrup was diluted to 50% solids. This solution had a freezing point of −23° C. and a viscosity of 65 cP at 40° F.

This solution is sprayed onto a moving coal bed carried on a conveyor belt.

EXAMPLE 3

A solution of a high fructose corn syrup that was diluted to a solids content of 50% was blended in a 1:1 volume ratio with a solution of sodium chloride (23% solids). This solution had a freezing point of −26° C., a viscosity of 1.9 cP at 75° F., 4.2 cP at 40° F. and 5.8 cP at 23° F.

A viscosifier is added. This solution is sprayed onto a moving coal bed carried on a conveyor belt at 40° F.

EXAMPLE 4

A solution of high fructose corn syrup (50% solids) was blended in a 3:7 volume ratio with a solution of sodium chloride (23% solids). This solution had a freezing point of −28° C., a viscosity of 1.7 cP at 75° F., 2.7 cP at 40° F. and 3.5 cP at 23° F.

A viscosifier is added. This solution is sprayed onto a moving coal bed carried on a conveyor belt 40° F.

EXAMPLE 5

A solution of high fructose corn syrup (50% solids) was blended in a 1:9 volumetric ratio with a solution of natural blend obtained as a by-product from oil well drilling. This blend had approximately 30% solids by weight, including approximately 20% calcium chloride, 5% calcium chloride, and 5% magnesium chloride. This blend had a freezing point of −47° C., a viscosity of 2.5 cP at 75° F., 3.8 cP at 40° F, 4.4 cP at 23° F., and 7.5 cP at 5° F.

A viscosifier is added. This solution is sprayed onto a moving coal bed carried on a conveyor belt at 40° F.

EXAMPLE 6

A solution of sugar beet molasses as received had a solids content of 65% at a freezing point of below −40° C.

This solution is sprayed onto a moving coal bed carried on a conveyor belt at 40° F.

EXAMPLE 7

A solution of desugared sugar beet molasses was diluted to 50% solids. This solution had a freezing point of −35° C.

This solution is sprayed onto a moving coal bed carried on a conveyor belt at 40° F.

EXAMPLE 8

A solution of the 50% desugared sugar beet molasses was blended in a 1:1 volume ratio with a solution of sodium chloride (23% solids). This solution had a freezing point of −35° C.

A viscosifier is added. This solution is sprayed onto a moving coal bed carried on a conveyor belt at 40° F.

EXAMPLE 9

A solution of the 50% desugared sugar beet molasses was blended in a 1:1 volume ratio with a solution of magnesium chloride (30% by weight). This solution had a freezing point of −41° C.

A viscosifier is added. This solution is sprayed onto a moving coal bed carried on a conveyor belt at 40° F.

EXAMPLE 10 AND COMPARATIVE EXAMPLES 1–3

Freezing point and corrosion data for Examples 7–9 (without adding the viscosifier) are set forth below in the following table. For comparison, solutions of sodium chloride (23% solids), calcium chloride (32% solids), and magnesium chloride (22% and 30% solids) (Comparative Examples 1–3 respectively) were evaluated. Freezing points were measured using a differential scanning calorimeter. Corrosion values were derived from coupon tests whereby values were obtained by setting the corrosion value for sodium chloride as equal to 100 and that for distilled water equal to 0 in accordance with the Corrosion Rate Test Method NACE Standard TM-01-69 (1976 rev.), as modified by Pacific Northwest Snowfighters and published as Test Method B in appendix A, "Snow and Ice Control Chemical Products, Specifications and Test Protocols for the PNS Consortium of British Columbia, Idaho, Montreal, Oregon and Washington Pacific Northwest Snowfighters, 1999) ("the PNS Test").

| Example | Freezing Point | Corrosivity |
|---|---|---|
| Comparative Example 1 (NaCl) | −21° C. | 100 |
| Comparative Example 2 (CaCl$_2$) | −50° C. | 120 |
| Comparative Example 3 (MgCl$_2$) | −33° C. (22%) | 80 (30%) |
| Example 7 | −35° C. | 26 |
| Example 8 | −35° C. | 33 |
| Example 9 | −41° C. | 15 |

EXAMPLE 11

A solution of the desugared sugar beet molasses was diluted to 45% solids with water.

This solution is sprayed onto a moving coal bed carried on a conveyor belt at 20° F.

EXAMPLE 12 AND COMPARATIVE EXAMPLE 4

The viscosities of the anti-icing solutions of Example 7, and 11 (without adding the viscosifier in Example 7) were evaluated using the Shell Cup method at various temperatures. For comparison, viscosities of the sodium chloride solution of Comparative Example 1 and of a 50% diethylene glycol solution (Comparative Example 4) were evaluated. The following results were obtained (data shown in cP).

| Temperature (°F.) | Example 7 | Example 11 | Comparative Example 1 | Comparative Example 4 |
|---|---|---|---|---|
| 75 | 9.5 | 7.1 | 1.2 | 4.8 |
| 25 | 29.0 | 16.0 | 1.5 | 17.0 |
| 15 | 33.0 | 18.0 | 1.5 | 22.0 |
| 5 | 41.0 | 21.0 | 1.7 | 30.0 |
| −5 | | | | 45.0 |
| −15 | | | | 60.0 |

EXAMPLE 13 solution of the sugar cane molasses (50% solids, having a carbohydrate content of 5 to 20%) is blended with sodium chloride.

This solution is sprayed onto a moving coal bed carried on a conveyor belt.

EXAMPLE 14

In separate experiments, desugared sugar beet molasses (50% solids) and a 1:9 by volume blend of a 50% solids desugared sugar beet molasses with a 50% potassium acetate solution were evaluated under a freeze conditioning agent test. These solutions both performed similarly to a diethylene glycol control.

Thus, it is seen that the invention provides a method for inhibiting freeze-clumping of aggregate materials.

All references, including publications, patent applications, and patents, cited herein are thereby incorporated by reference.

All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention. All percentages set forth herein are percentages by total weight.

Preferred embodiments of this invention are described herein. Variations of those preferred embodiments may become apparent to those of ordinary skill in the art upon reading the foregoing description. The inventors expect skilled artisans to employ such variations as appropriate. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A method for inhibiting freeze-clumping of an aggregate material, comprising applying to said aggregate material an amount of an anti-icing material, said amount being at least an amount effective to inhibit freeze-clumping of said aggregate material, said anti-icing material comprising an aqueous solution having a viscosity sufficient to adhere to said aggregate material to an extent suitable to inhibit freeze-clumping thereof, said solution comprising high fructose corn syrup solids, said aggregate material comprising coal, said solution having a solids content ranging from 20–90%.

2. A method according to claim 1, said anti-icing material being applied to said aggregate material as said aggregate material is being transported via a conveyor.

3. A method according to claim 1, said solution further including a viscosifier present in an amount effective to increase the viscosity of said solution relative to the viscosity of said solution absent said viscosifier.

4. A method according to claim 1, said solution further comprising a freezing point lowering agent selected from the group consisting of sodium chloride, potassium chloride, calcium chloride, magnesium chloride, sodium formate, calcium magnesium acetate, and potassium acetate.

5. A method according to claim 4, said solution further including a viscosifier present in an amount effective to increase the viscosity of said solution relative to the viscosity of said solution absent said viscosifier.

6. A clump-inhibited aggregate material comprising a plurality of units of a material forming an aggregation; and an anti-icing material in combination with at least some of said units and being present in combination with said aggregate material in at least an amount effective to inhibit freeze-clumping of said aggregate material, said anti-icing material comprising an aqueous solution having a viscosity sufficient to adhere to said aggregate material to an extent suitable to inhibit freeze-clumping thereof, said solution comprising high fructose corn syrup solids, said aggregate material comprising coal, said solution having a solids content ranging from 20–90%.

7. A clump-inhibited aggregate material according to claim 6, said solution further including a viscosifier present in an amount effective to increase the viscosity of said solution relative to the viscosity of said solution absent said viscosifier.

8. A clump-inhibited aggregate material according to claim 6, said solution further comprising a freezing point lowering agent selected from the group consisting of sodium chloride, potassium chloride, calcium chloride, magnesium chloride, sodium formate, calcium magnesium acetate, and potassium acetate.

9. A clump-inhibited aggregate material according to claim 8, said solution further including a viscosifier present in an amount effective to increase the viscosity of said solution relative to the viscosity of said solution absent said viscosifier.

* * * * *